United States Patent
Kelm-Kläger et al.

[11] Patent Number: 6,006,599
[45] Date of Patent: *Dec. 28, 1999

[54] METHOD AND APPARATUS FOR TESTING TIRES ON A WHEEL BALANCING MACHINE

[75] Inventors: Ronald Kelm-Kläger, Landsberg/Lech; Hermann Bux, Adelzhausen, both of Germany

[73] Assignee: Beissbarth GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/094,143

[22] Filed: Jun. 9, 1998

[30] Foreign Application Priority Data

Jun. 10, 1997 [DE] Germany .................. 197 24 464

[51] Int. Cl.$^6$ .................................. G01M 17/02
[52] U.S. Cl. .................. 73/146; 73/457; 73/487
[58] Field of Search .................. 73/146, 457, 487

[56] References Cited

FOREIGN PATENT DOCUMENTS

| | | |
|---|---|---|
| 0 069 402 A1 | 1/1983 | European Pat. Off. . |
| 0 315 099 A2 | 10/1988 | European Pat. Off. . |
| 0 766 079 A1 | 4/1997 | European Pat. Off. . |
| 31 24 248 C2 | 10/1985 | Germany . |
| 38 28 610 C2 | 10/1991 | Germany . |
| 42 31 578 A1 | 3/1994 | Germany . |
| 44 42 980 A1 | 6/1996 | Germany . |

*Primary Examiner*—Joseph L. Felber
*Attorney, Agent, or Firm*—Crompton, Seager & Tufte

[57] ABSTRACT

In the tire examination method before and after an alteration in the tire pressure a respective interferogram is produced of the tire surface using coherent radiation and the interferogram is converted into a modulo $2\pi$ image, which for its part is processed to obtain a gray value image and in the case of which from a comparison of the gray value images information concerning any defects present in the tire is obtained. For testing a tire the wheel, which bears such tire to be tested, is arranged on a driven roller set by driving the vehicle with the wheel, a test head is moved toward the tire to be at a predetermined test distance therefrom for producing such interferograms, at a first test segment of the tire examination for defects is performed, the wheel is incrementally rotated by the roller set by an amount equal to the size of a test segment and so many test segments are examined that the complete tire is tested. The tire testing apparatus possesses an air pressure means for altering the tire pressure, a test head and a computer.

26 Claims, 3 Drawing Sheets

METHOD AND APPARATUS FOR TESTING TIRES ON A WHEEL BALANCING MACHINE

BACKGROUND OF THE INVENTION

The invention relates to a method of testing tires, wherein before and after an alteration in the tire pressure a respective interferogram is produced of the tire surface using coherent radiation and the interferogram is converted into a modulo $2_\pi$ image, which for its part is processed to obtain a gray value image and in the case of which from a comparison of the gray value images information concerning any defects present in the tire is obtained, and furthermore to an apparatus for the performance of the method.

The German patent publication 42 31 578 A1 discloses a method for the determination of the structural strength of tires, in which the tire is illuminated with coherent light, the radiation diffusely reflected back from the tire is divided up in a twin beam interferometer into two beam parts, in the twin beam interferometer one of the two beam parts is tilted in relation to the other beam part as a shearing operation, in the twin beam interferometer one of the two beam parts is phase shifted in steps, the radiation diffusely reflected by the object being tested and split up into two beam parts and then united again is returned through components presenting an image of the surface of the tire with a large aperture to an electronic image sensor system and the signals produced by the image sensor system are digitalized and further processed to give a modulo $2_\pi$ image and the modulo $2_\pi$ image is confirmed as an output gray value image.

In accordance with the German patent publication 195 02 073 A1 the above mentioned method is further developed to the extent that the output gray value image is partially differentiated, a second gray value image identical to the output gray value image is produced and it is geometrically displaced in the shearing direction in relation to the output gray value image and is altered by a gray value which is constant over the entire image area and the second gray value image manipulated in this manner is subtracted from the output gray value image and so that a resulting gray value image is produced, from which any defects in the tire may be seen.

When it is borne in mind that structural damage to a car tire and more particularly damage in the carcass including the belt, may substantially impair the safety of the vehicle, it will be seen to be desirable to perform examinations on tires at regular intervals.

SUMMARY OF THE INVENTION

One object of the invention is to create a tire testing method and apparatus, which permit examination of tires as part of servicing operations for the wheels of a vehicle from time to time.

For this purpose in the method in accordance with the invention for the examination of a tire the wheel mounting the tire to be tested is mounted onto a motor-driven machine, a test head for producing such interferograms is moved toward the tire so as to be at a predetermined distance therefrom, the examination for defects is performed on a first test segment of the tire, the motor of the wheel balancing machine is driven to rotate incrementally the wheel by an amount equal to the size of a test segment, and the two-last mentioned steps are repeated until the entire tire has been tested.

The costs of the test head are substantially dependent on the area, which may be covered in a single measuring step. Consequently the expense due to the test head may be substantially reduced to the extent that segmentwise measurement of the tire is provided for, wherein a plurality of test segments on the tire are brought into the field of view of the test head one after the other. One could think of incrementally rotating the wheel by hand. This would certainly minimize the costs of adapting the wheel balancing machine to this partcular purpose. Another alternative would be to use a separate small electric motor to rotate the shaft of the wheel balancing machine by appropriate amounts corresponding to the size of the test segment. This would add substantial hardware costs including the motor and the control thereof. According to the invention, the motor of the wheel balancing machine is not only used for rotating the wheel during the balancing procedure, but also to incrementally rotate the wheel during the tire testing procedure. The problem of this solution is that the motor of the wheel balancing machine is normally designed as a strong motor to provide enough speed to the wheel to performe the balancing procedure. In the balancing procedure, the wheel is driven to a particular maximum speed, then the motor is stopped and the wheel is allowed to slow down or it is slowed down by a braking action. The motor control necessary for such a procedure is not adapted to rotate the wheel on the wheel balancing machine at slow speed let alone to control the rotation incrementally. Therefore, an adapted motor control method and apparatus is necessary in order to adapt the wheel balancing machine of the state of art to the present purpose. In other words, in combining the tire tester known from the German patent application 42 31 578 A1 and a wheel balancing machine of the state of art into one single machine, certain changes and provisions have to be made to make such a combination possible. In spite of the specialised motor control required for the machine, a combination machine as envisioned in the present application has distinct advantages over the state of art as to cost and performance.

In the case of a further advantageous embodiment of the invention the drive motor of the roller set is operated by a computer via a frequency converter and more especially the incremental rotation of the wheel is measured and a corresponding input signal fed to the computer. This ensures that the wheel may be reliably incrementally rotated exactly by the required amount without the structural complexity being unnecessarily increased.

In accordance with a further advantageous development of the method the size data necessary for the further rotation of the wheel, as for example the tire size, are supplied to the computer or obtained from a table in the computer. If the size data are held in the form of a table, it is possible for such table to be continuously supplemented by manual inputs so that there is the advantage that setting up the apparatus for testing becomes steadily simpler.

A further advantageous development of the method in accordance with the invention is characterized in that the test head is moved in the X and Y directions in order to bring the same into position for different sized tires. By such a simple moving scheme, the test head may be positioned in the correct testing position easily and without further means.

A further advantageous development of the method in accordance with the invention is characterized in that during the approach movement of the test head its distance from the tire is monitored and an indication is displayed, when the test head has reached its intended position and the test head is then arrested. This means that a safe, rapid and exact setting of the test head in relation to the tire is possible.

A further advantageous development of the method in accordance with the invention is characterized in that the tire pressure is reduced for each test step and after testing has been completed it is returned to the nominal pressure. By following this method, the changing of the tire pressure during a whole testing cycle wherein the test sectors are measured one after the other, may be carried out with minimum time loss as the pressure change from a first testing step to a second testing step starts from the end pressure present at the end of the first testing step. Furthermore, after each pressure change, the tire has to rest for a certain period of time, so that the test results are not influenced by ongoing movements due to the pressure change. Therefore, the time consumed for such recovery time periods is minimized if the number of pressure changes made during a test cycle is brought to a minimum. The number of recovery time periods would increase if the tire pressure would be brought up to nominal pressure after each tire testing step concerning a particular section of the tire.

The tire testing apparatus of the invention comprises an air pressure means for altering the tire pressure, a test head and a computer, which before and after an alteration in the air pressure produce, using coherent radiation, a respective interferogram of the tire surface and convert the interferogram into a modulo $2_\pi$ image, which for its part is processed to yield a gray value image, and in which on the basis of a comparison of the gray value images information concerning any defects in the tire is obtained and the apparatus is characterized by a wheel balancing machine on which the wheel with the tire to be tested thereon may be mounted, by a positioning means for the test head, with which the test head is to be moved up to a predetermined distance from the tire for producing the interferograms, and by a control means for the wheel balancing machine in order to incrementally rotate the wheel by an amount corresponding to a test segment, when the testing of the preceding test segment is concluded.

An advantageous embodiment of the tire testing apparatus of the invention is characterized in that the motor of the wheel balancing machine is operated by means of a frequency converter, which is adapted to be controlled by a computer. This is a most reliable way of controlling the motor of the wheel balancing machine such that it incrementally moves the wheel at a low speed during the tire testing procedure.

An advantageous embodiment of the tire testing apparatus of the invention is characterized in that a synchro is connected with the shaft of the wheel balancing machine, such synchro sensing incremental rotation of the shaft and supplying a corresponding signal to the computer, which switches off the motor drive, when the wheel has been rotated incrementally through one further test segment. By using this arrangement, a feedback relating to the incremental movement of the wheel may be produced and used to exactly control the incremental movement of the wheel on the balancing machine.

An advantageous embodiment of the tire testing apparatus of the invention is characterized in that the computer comprises a memory, wherein a table is provided, which comprises size data, as is necessary for the incremental rotation of a wheel in a manner dependent on the size of the wheel. The memory in the computer ensures that as little expert knowledge as possible is necessary to run the machine.

An advantageous embodiment of the tire testing apparatus of the invention is characterized in that the positioning means possesses an X slide for shifting the test head in parallelism the axis of the shaft and a Y slide for shifting the test head perpendicularly to the axis of the shaft, and in that the slides and the test head are integrated in a housing of the wheel balancing machine. This embodiment of the invention has the advantage that the bulk of the machine is minimized and that the test head is somehow protected within the housing of the wheel balancing machine which is an important advantage in view of the rough environment being present in automobile servicing workshops where such machines are used.

An advantageous embodiment of the tire testing apparatus of the invention is characterized in that the X slide and the Y slide are able to be shifted by motors under the control of a computer. Thereby, the positioning of the test head is automised and can be done automatically without a particular knowledge or skill of the man operating the machine.

An advantageous embodiment of the tire testing apparatus of the invention is characterized in that the positioning means comprises two pivot arms, which are provided on the wheel balancing machine or in that the positioning means comprises a stay on the test head. Preferably, the positioning means or, respectively, the stay may be arrested when the test head has reached the test position. These embodiments are mechanical means for supporting the test head and setting the distance between the tire and the test head and, as mechanical means, are most reliable and simple to operate.

An advantageous embodiment of the tire testing apparatus of the invention is characterized by a distance setting device for setting the distance between the test head and the tire. Preferably, the distance setting device comprises two obliquely set diodes on the end of the test head, the beams from such diodes intersecting at the test distance. This distance setting device allows a setting of the distance without touching the tire by optical means. The distance setting device can be operated easily.

An advantageous embodiment of the tire testing apparatus of the invention is characterized in that the distance setting device comprises a mechanical feeler on the test head, which feeler on reaching the test distance contacts the tire. This is a mechanical version of the distance setting device which is simple and adapted to the rough environment.

An advantageous embodiment of the tire testing apparatus of the invention is characterized in that the distance setting device comprises an ultrasonic range finding means. This distance setting device is another device which does not need to touch the tire which is advantageous also if the surface which is accessible has some profile.

An advantageous embodiment of the tire testing apparatus of the invention is characterized by valve which is able to be set both as regards the size of its opening and also as regards the time of opening. Such a valve enables a quick and automatic setting of the tire pressure under the control of a computer which only controls the size of the valve opening and the opening time of the valve. This also has an advantage in view of minimizing the time needed for carrying out a complete testing cycle.

An advantageous embodiment of the tire testing apparatus of the invention is characterized by a central control means for the control of the air pressure in the tire, the pressure in the tire having to be reduced for every test step by one stage and having to be returned to the nominal pressure along conclusion of a test. As already mentioned above, this minimizes also the time needed for carrying out a complete testings process cycle.

An advantageous embodiment of the tire testing apparatus of the invention is characterized by a central computing means for control of the functions of the tire testing apparatus, the computing means preferably being integrated with the computing means of the wheel balancing machine. By combining the computing means of the testing apparatus with the computing means of the balancing machine, some savings in respect to the hardware required can be made, which reduces the costs and improves reliability.

An advantageous embodiment of the tire testing apparatus of the invention is characterized by a monitor for display of the results of measurement, and which also serves for display of information during wheel balancing of the wheel. This is another hardware sharing system for reducing costs.

A further understanding of the nature and advantages of the present invention may be realized by reference to the remaining portions of the specification and the drawings.

DESCRIPTION OF THE SPECIFIC EMBODIMENTS

Figure 1:
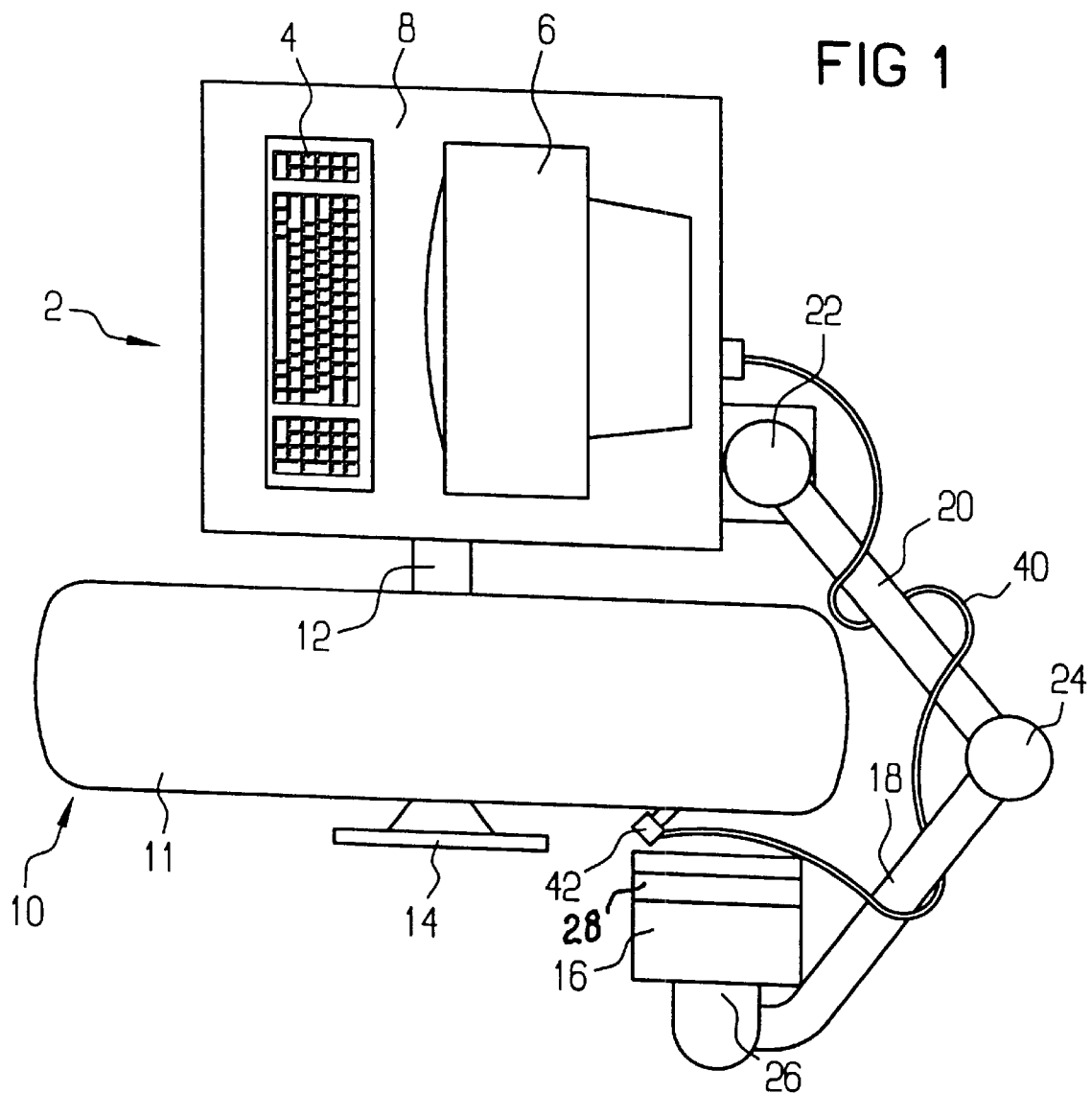
FIG. 1 diagrammatically shows a plan view of a tire testing apparatus in accordance with a first embodiment of the invention using a wheel balancing machine.

Referring now to FIG. 1 a first embodiment of the tire testing machine of the invention will be described.

FIG. 1 shows a wheel balancing machine 2 comprising a keyboard 4 and a monitor 6, which are arranged on a housing 8. A wheel 10 with a tire 11 is mounted by means of an instant clamping means 14 on a shaft 12 of the wheel balancing machine 2, said clamping means engaging the metal part 13 (FIG. 2) of the wheel 10.

A test head 16 is mounted by means of two parallel links or arms 18 and 20 on the housing 8 of the wheel balancing machine 2. The arm 20 has its one end pivotally mounted on a bracket 22 on the housing 8. One joint 24 connects the arm 20 with the arm 18, and the arm 18 is connected via a joint 26 with the test head 16. Accordingly it is possible for the test head 16 to be pivoted from a position (not illustrated) wherein it is withdrawn on the housing 8 into a test position (FIG. 1), wherein it is opposite to the side wall of the tire 11 in the testing position. A handle 28 is provided on the test head 16 and has a press button switch (not illustrated) by means of which the positioning means (parallel guides or arms 18 and 20) can be arrested, when the test head 16 has reached the test position.

Figure 2:
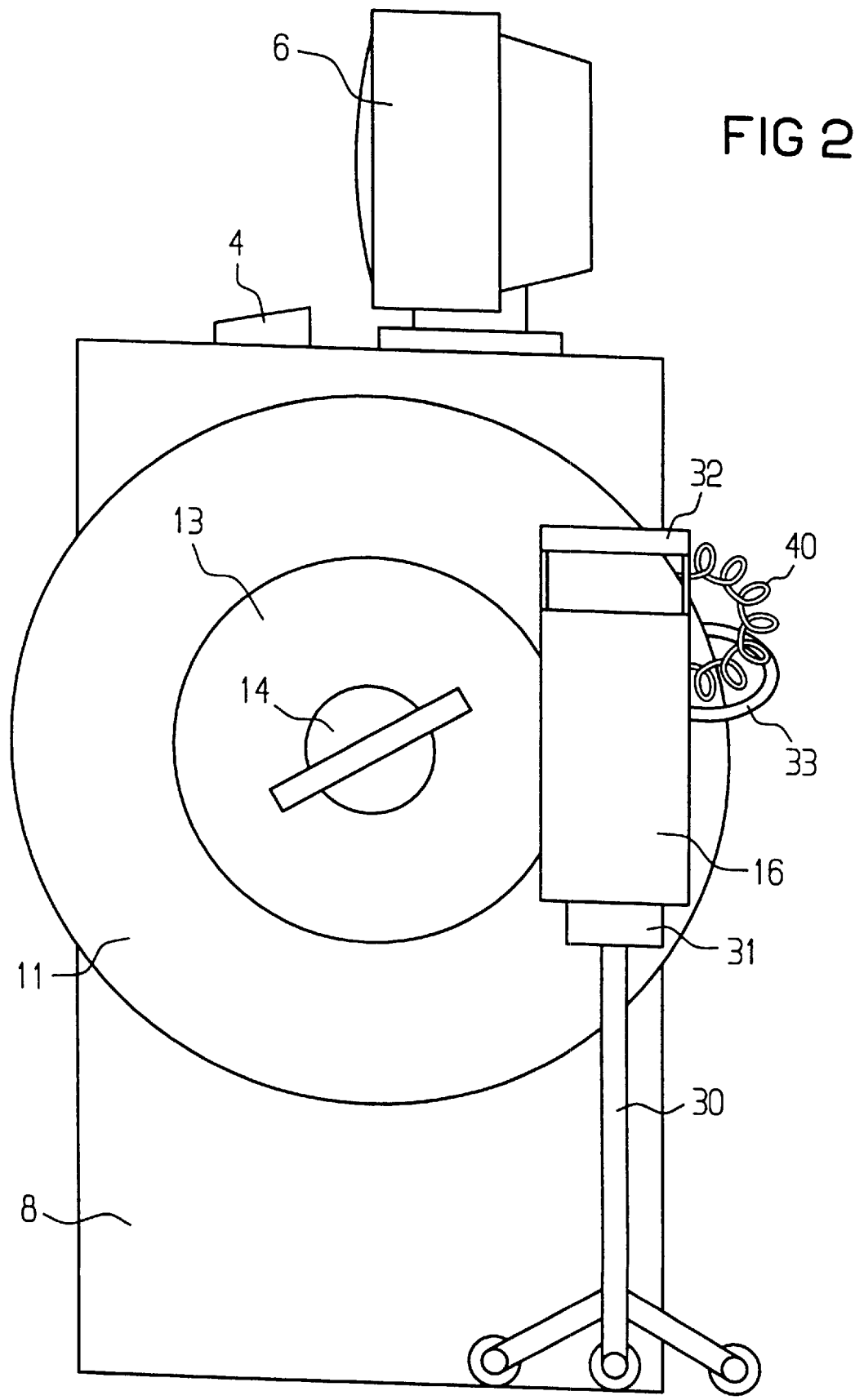
FIG. 2 shows a diagrammatic lateral elevation of a tire testing apparatus according to a second embodiment of the invention using a wheel balancing machine.

FIG. 2 shows a second embodiment of the invention in a lateral elevation, parts equivalent to those of FIG. 1 having the same reference numerals. For supporting the test head 16 a stay 30 is provided, with which the test head 16 may be held at the same level as the shaft of the wheel balancing machine 2. When the test head 16 is located in the test position, the stay 30 may be arrested in this position in order to ensure that the test head 16 remains in the test position. The test head 16 may be drawn into position with the aid of a handle 32. The arresting effect may be caused using a press button switch (not illustrated), which is provided on the handle 32. A cable 33 serves to supply the test head with electrical power and to supply the signals to the central computing unit.

In the housing 8 (FIGS. 1 and 2) there is furthermore a control means (not illustrated), which comprises the controller for an air pressure means, which comprises a pressure hose 40 and a valve 42, which is able to be mounted on the inlet valve of the tire. The valve 42 is able to be controlled or set both as regards its aperture (rate of discharge flow) and also as regards opening and closing so that the alteration in pressure in the tire is able to be varied both by setting the valve opening and also by setting the time during which the valve is open.

Figure 3:
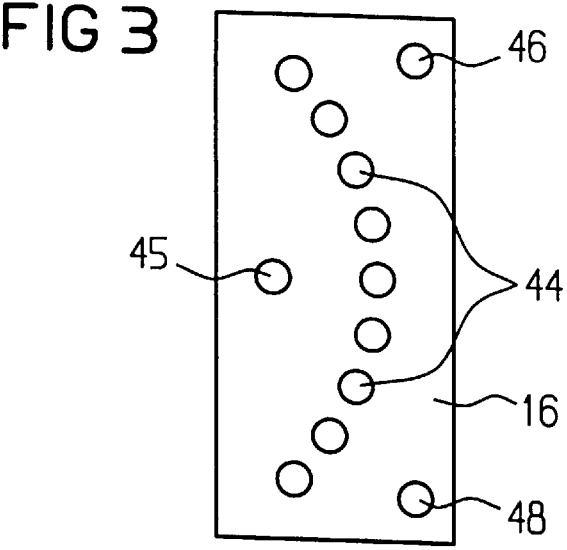
FIG. 3 is a view of the front part of the test head.

The test head 16 is illustrated end-on in FIG. 3 and laser diodes 44 will be seen for scanning or sensing the interferograms. Furthermore two diodes 46 and 48 are provided, which serve to set the test distance between the test head 16 and the side wall of the tire 11. For this purpose the two laser diodes 46 and 48 are so set obliquely in the visible range that their laser beams make an angle with one another and intersect at the point corresponding the test distance between the test head and the tire's 11 side surface. When the test head 16 is shifted toward the tire 11, it will be at the test distance, when the two laser beams form a single point on the side wall of the tire 11. Furthermore the figure diagrammatically shows an objective 45 of a camera, which takes pictures of the tire being tested.

The speed of rotation of the motor (not illustrated) of the wheel balancing machine is so controlled via a controlled frequency converter (not illustrated) by the central computer unit that it is has relatively low constant value. A synchro on the shaft 12 is responsive to the speed of rotation of the shaft and produces an output signal corresponding to the step or amount by which the tire has been rotated. In the computer the output signal from the synchro is utilized to turn off the drive motor when the tire has been turned incrementally by an amount corresponding to the size of a test segment. In the case of the embodiment depicted in FIG. 3 a test segment is equal to $\frac{1}{8}$ of the total periphery of the tire so that the tire must be turned through seven further steps or increments in order to check the tire completely.

Leads for compressed air, for electrical power supply to the test head and a data line leading to the computer unit are connected with the control means and the test head. Furthermore the motor for driving the shaft of the wheel balancing machine and the synchros on the shaft of the wheel balancing machine are connected with the computer unit, neither such connection lines nor the computer unit being illustrated in order to make the drawing more straightforward.

Figure 4:
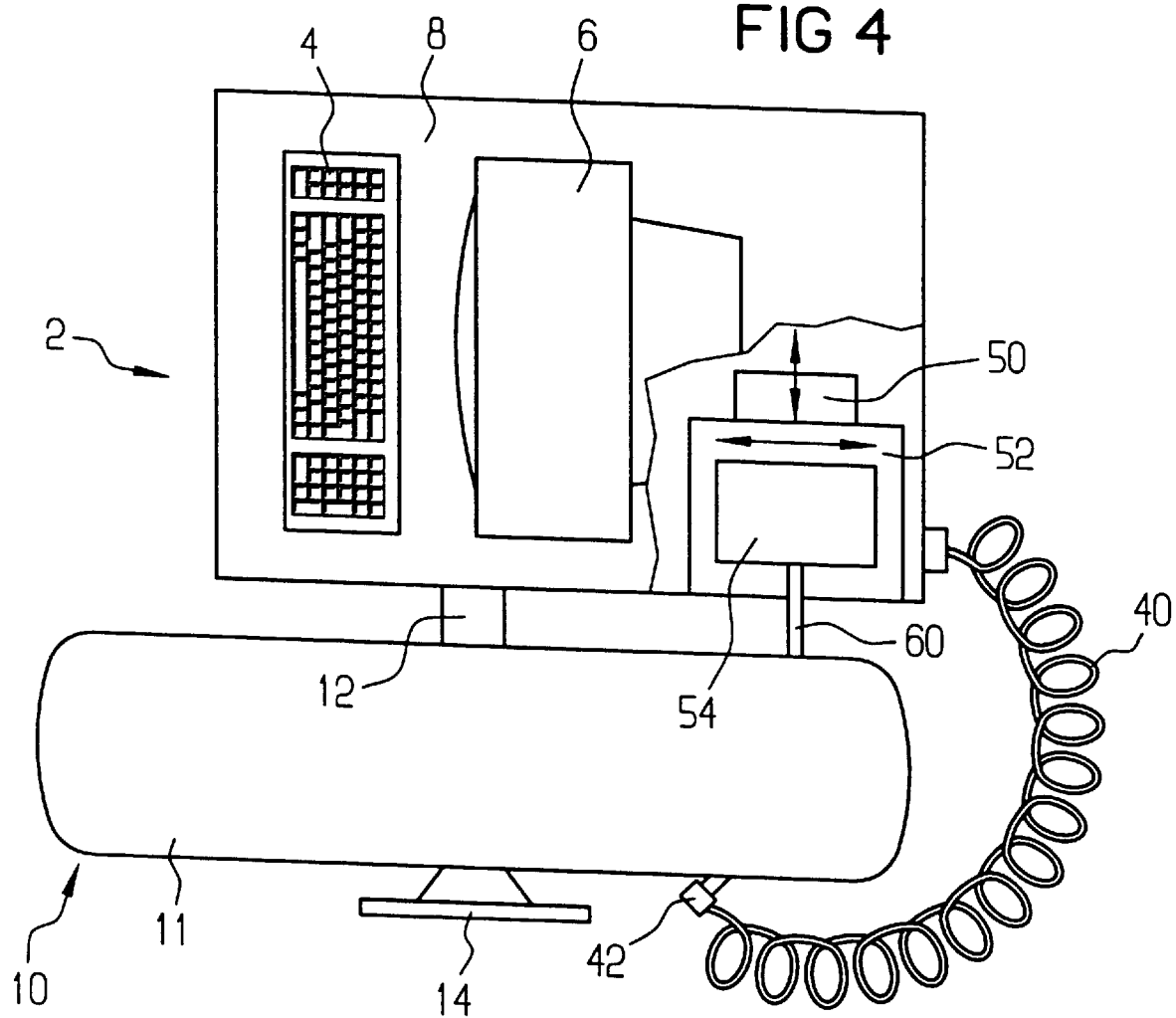
FIG. 4 is a diagrammatic plan view of part of a further embodiment of the tire testing apparatus of the invention.

In FIG. 4 a further embodiment of the tire testing apparatus will be seen, parts equivalent to those of FIGS. 1 through 3 having the same reference numerals.

In FIG. 4 an X–Y positioning means with an X slide 50 and a Y slide 52 and a test head 54 is depicted. The X slide 50 serves for setting the distance between the test head 54 and the side surface of the tire 11. In the illustrated working embodiment the X direction of the X slide 50 is parallel to the shaft 12 and Y direction of Y slide 52 is perpendicular to the shaft 12.

The X slide 50 and the slide 52 are slidingly supported by linear bearings having shaft guides. The X slide 50 and the Y slide 52 are respectively provided with arresting means (not illustrated), which render possible arresting of the slides in a test position, wherein the test head 54 is located in the position for the tire checking operation.

In the case of the embodiment according to FIG. 4 the setting of the distance between the test head 54 and the side wall of the tire 11 is performed using a feeler 60, which in the top part of the test head 54 may be moved out as far as a position corresponding to the test distance or clearance. When the test head 54 with the slides 50 and 52 has been brought into the test position, the feeler 60 will engage the inner wall of the tire 11. Following this the test head is arrested and the feeler 60 retracted.

In this embodiment of the invention there is the advantage that the slides 50 and 52 are driven by motors (not illustrated) under the control of the computer. In this case it is possible for an output signal to be supplied by the feeler 60 to the computer, when the test position is reached.

In all embodiments of the invention a central computer means is provided for control of the functions of the tire testing apparatus, such computer means being integrated in the computer of the wheel balancing machine so that here as well hardware complexity is reduced. Furthermore the monitor for indicating the measurement readings is employed both for wheel balancing and for the testing of the tires to the extent that the information relevant to the two test methods is displayed on the same monitor.

The manner of functioning of the tire testing apparatus is as follows.

Firstly the wheel, which bears the tire to be examined, is mounted on a wheel balancing machine, the shaft of the wheel balancing machine being able to be driven at different speeds of rotation under the control of a computer both for wheel balancing of the wheel and also for performing the tire examination.

The next step is for a test head to be moved up to the tire so as to be at a predetermined test distance therefrom for producing the interferograms and arrested in such position.

After the mounting of the tire on the wheel balancing machine the air pressure valve is connected with the tire.

Previous to performing the first test sequence the data specific to the wheel and, respectively, the size data for incremental rotation of the shaft of the wheel balancing machine, as for example the duration of rotation at a constant speed of rotation, which are dependent on the wheel dimensions, are supplied to the computer as an input or, respectively, looked up in a table.

Then the examination of the tire is performed on a first tire segment thereof using the initially mentioned method. After the first test segment has been tested, the wheel is further rotated by the shaft of the wheel balancing machine by a step equal to the size of a test segment, the shaft of the wheel balancing machine being controlled via a computer and in a manner dependent on the output signals of a synchro on the shaft of the wheel balancing machine. When the next test segment of the wheel has and been brought into position, the test head is activated in order to test or examine the next test segment.

Thereafter test sequences and incremental further steps in rotation are performed until the entire tire has been tested. For each test sequence, as already mentioned, between a first series of interferograms and a second series of interferograms the pressure is reduced, this also being computer controlled. The reduction in pressure hence occurs in two stages, the pressure being reduced from a nominal pressure by one step in each testing sequence. Once the test has been completed the air pressure in the tire is then returned to the nominal pressure, the valve and the control means connected therewith also being employed.

The invention is not limited to the working embodiments as described. Thus for instance the setting of the distance between the test head and the side surface of the tire may be performed using an ultrasonic range finder and not optically (FIG. 1) or mechanically (FIG. 4).

It is to be understood that the above description is intended to be illustrative and not restrictive. Many embodiments will be apparent to those skilled in the art upon reviewing the above description. Those skilled in the art will recognize as an equivalent or alternative method of tire testing and combining a tire testing machine with a wheel balancing machine. The scope of the invention should, therefore, be determined not as reference to the above description, but should instead be determined with reference to the apended claims along with the full scope of equivalence to which such claims are entitled.

What is claimed is:

1. A tire testing method, wherein
   (a) before and after an alteration in tire pressure a respective interferogram is produced of the tire surface using coherent radiation and the interferogram is processed to obtain information concerning defects present in the tire, and wherein
   (b) the wheel, which bears such tire to be tested, is mounted on a motor-driven wheel balancing machine, that
   (c) a test head arranged on the wheel balancing machine is moved toward the tire to be at a predetermined test distance therefrom for producing such interferograms,
   (d) at a test segment of the tire examination for defects is performed,
   (e) the motor of the wheel balancing machine is driven to incrementally rotate the wheel by an amount equal to the size of another test segment and
   (f) the steps (d) and (e) are repeated until the entire tire has been examined.

2. The method as claimed in claim 1, wherein the drive motor of the wheel balancing machine is operated by a computer via a controlled frequency converter.

3. The method as claimed in claim 2, wherein the incremental rotation of the motor is sensed and a corresponding input signal fed to the computer.

4. The method as claimed in claim 3, wherein size data, such as, for further incremental rotation of the wheel is communicated to the computer or is looked up from a table in the computer.

5. The method as claimed in claim 1, wherein the test head is moved in the X and Y directions in order to bring same into position for different sized tires.

6. The method as claimed in claim 1, wherein when moving said test head toward said tire the distance of the test head from the tire is monitored and a signal is produced when the test head has reached the test position and in that the test head is then arrested.

7. The method as claimed in claim 1, wherein the tire pressure is reduced for each test step and after testing has been completed it is returned to the nominal pressure.

8. A tire testing apparatus comprising:
   an air pressure means for altering tire pressure,
   a test head and a computer, which before and after an alteration in the air pressure produce, using coherent radiation, a respective interferogram of the tire surface which is processed to yield information concerning any defects in the tire; and
   a motor-driven wheel balancing machine on which the wheel with the tire to be tested thereon may be mounted, a positioning means for the test head, with which the test head is to be moved up to a predetermined distance from the tire for producing the interferograms, and a control means for the motor of the wheel balancing machine in order to incrementally rotate the wheel by an amount corresponding to a test segment, when the testing of the preceding test segment is concluded.

9. The apparatus as claimed in claim 8, wherein the motor of the wheel balancing machine is operated by means of a frequency converter, which is adapted to be controlled by a computer.

10. The apparatus as claimed in claim 9, wherein a synchro is connected with the shaft of the wheel balancing machine, such synchro sensing incremental rotation of the shaft and supplying a corresponding signal to the computer, which switches off the motor drive, when the wheel has been rotated incrementally through one further test segment.

11. The apparatus as claimed in claim 10, wherein the computer comprises a memory, wherein a table is provided, which comprises size data, as is necessary for the incremental rotation of a wheel in a manner dependent on the size of the wheel.

12. The apparatus as claimed in claim 8, wherein the positioning means possesses an X slide for shifting the test head in parallelism the axis of the shaft and a Y slide for shifting the test head perpendicularly to the axis of the shaft, and in that the slides and the test head are integrated in a housing of the wheel balancing machine.

13. The apparatus as claimed in claim 12, wherein the X slide and the Y slide are able to be shifted by motors under the control of a computer.

14. The apparatus as claimed in claim 12, wherein the positioning means is arrested when the test head has reached the test position.

15. The apparatus as claimed in claim 8, wherein the positioning means comprises two pivot arms, which are provided on the wheel balancing machine.

16. The apparatus as claimed in claim 15, wherein the positioning means is arrested when the test head has reached the test position.

17. The apparatus as claimed in claim 8, wherein the positioning means comprises a stay on the test head.

18. The apparatus as claimed in claim 17, wherein the positioning means or, respectively, the stay may be arrested, when the test head has reached the test position.

19. The apparatus as claimed in claim 8, having a distance setting device for setting the distance between the test head and the tire.

20. The apparatus as claimed in claim 19, wherein the distance setting device comprises two obliquely set diodes on the end of the test head, the beams from such diodes intersecting at the test distance.

21. The apparatus as claimed in claim 19, wherein the distance setting device comprises a mechanical feeler on the test head, which feeler on reaching the test distance contacts the tire.

22. The apparatus as claimed in claim 19, wherein the distance setting device comprises an ultrasonic range finding means.

23. The apparatus as claimed in claim 8, having a valve which is able to be set both as regards the size of its opening and also as regards the time of opening.

24. The apparatus as claimed in claim 23, having a central control means for the control of the air pressure in the tire, the pressure in the tire having to be reduced for every test step by one stage and having to be returned to the nominal pressure along conclusion of a test.

25. The apparatus as claimed in claim 8, having a central computing means for control of the functions of the tire testing apparatus, the computing means being integrated with the computing means of the wheel balancing machine.

26. The apparatus as claimed in claim 8, having a monitor for display of the results of measurement, and which also serves for display of information during wheel balancing of the wheel.

* * * * *